US007397013B2

(12) United States Patent
Jones et al.

(10) Patent No.: US 7,397,013 B2

(45) Date of Patent: Jul. 8, 2008

(54) PLASMA LINEATION ELECTRODE

(75) Inventors: Charles Raymond Jones, Queen Creek, AZ (US); Jason James Schellin, Tempe, AZ (US)

(73) Assignee: Heraeus Inc., Chandler, AZ (US)

( * ) Notice: Subject to any disclaimer, the term of this patent is extended or adjusted under 35 U.S.C. 154(b) by 0 days.

(21) Appl. No.: 11/285,151

(22) Filed: Nov. 23, 2005

(65) Prior Publication Data

US 2007/0114212 A1 May 24, 2007

(51) Int. Cl.
*B23K 10/00* (2006.01)

(52) U.S. Cl. ............................ 219/121.44; 219/121.47; 219/76.16; 219/121.52; 315/111.21

(58) Field of Classification Search ................. 219/119, 219/121.36, 121.47, 76.15, 76.16, 121.52, 219/121.48, 121.5, 121.49, 75; 313/231.31, 313/231.41; 315/111.21
See application file for complete search history.

(56) References Cited

U.S. PATENT DOCUMENTS 4,136,273 A * 1/1979 Eujita et al. ............ 219/121.36
4,916,273 A * 4/1990 Browning .............. 219/121.47
5,122,632 A * 6/1992 Kinkelin ................ 219/121.63
5,900,272 A 5/1999 Goodman
6,209,312 B1 * 4/2001 Singer et al. .................. 60/770
6,679,880 B2 * 1/2004 Yang et al. ..................... 606/41
6,987,238 B2 * 1/2006 Horner-Richardson et al. ... 219/121.51

* cited by examiner

*Primary Examiner*—Mark Paschall
(74) *Attorney, Agent, or Firm*—McDermott Will & Emery LLP

(57) ABSTRACT

A plasma spray device is provided. The plasma spray device includes a plasma chamber region for having a plasma formed and a throat region coupled to the plasma chamber region. The throat region has an end surface and an axial bore. The axial bore is formed substantially along a longitudinal axis of the throat region, and has a non-circular cross-sectional shape. The axial bore at the end surface is for ejecting a plasma stream. The axial bore may include a plurality of grooves formed substantially along the longitudinal axis of the throat region. The cross-sectional shape of the axial bore may alternatively be defined by a plurality of overlapping substantially circular lobes. The plasma stream has a flow that is lineated before the plasma stream is ejected from the axial bore. The plasma stream has an overall particle pattern angle of less than about 50° after the plasma stream exits the axial bore.

22 Claims, 6 Drawing Sheets

PLASMA LINEATION ELECTRODE

STATEMENT REGARDING FEDERALLY SPONSORED RESEARCH OR DEVELOPMENT

Not Applicable.

FIELD OF THE INVENTION

The present invention generally relates to plasma spraying and, in particular, relates to plasma spray methods and apparatus for improved plasma spraying of coating material.

BACKGROUND OF THE INVENTION

Plasma spraying is a process in which a coating material is sprayed by a plasma spray device onto a target surface to provide a desired coating. In a conventional plasma spray device, the induced swirling of gas around the cathode centrifugally ejects any injected coating material away from the plasma stream after it exits the anode, reducing the amount of coating material applied to the target surface. In some plasma spray devices, the plasma stream exiting the anode may have an overall particle pattern angle of greater than 90°. The resulting depositional efficiency of the spraying process may be as low as 25% in such an arrangement. Such a low depositional efficiency results in increased costs arising from longer processing times and wasted coating materials.

Moreover, a conventional plasma spray device may experience high consumable wear, requiring the frequent replacement of parts worn down by constant contact with the high energy DC arc which ignites the plasma.

What is needed is a plasma spraying process and apparatus with an increased depositional efficiency and a longer consumable life. The present invention satisfies these needs and provides other advantages as well.

SUMMARY OF THE INVENTION

In accordance with the present invention, an anode for a plasma spray device has an axial bore with a non-circular cross-sectional shape for lineating the flow of a plasma stream within the anode. The lineation of the flow of the plasma stream reduces the angle of the overall particle pattern of the plasma stream after it exits the anode, resulting in a plasma spray device with a higher depositional efficiency and lower processing times. The turbulence of the plasma stream caused by the transition from a cyclonic flow to a lineated flow reduces the wear on the anode caused by the high energy DC arc used to form the plasma, resulting in a longer consumable life for the anode.

According to one embodiment, the present invention is a plasma spray device including a plasma chamber region for having a plasma formed and a throat region coupled to the plasma chamber region. The throat region includes an end surface and an axial bore. The axial bore is formed in a direction substantially along a longitudinal axis of the throat region, and has a non-circular cross-sectional shape. The axial bore at the end surface is for ejecting a plasma stream.

According to another embodiment, a plasma spray device of the present invention includes a throat region having an end surface and an axial bore. The axial bore is formed within the throat region in a direction substantially along a longitudinal axis of the throat region. The axial bore has a plurality of grooves, at least a portion of which are formed in a direction substantially along the longitudinal axis of the throat region. The axial bore at the end surface is for ejecting a plasma stream.

According to yet another embodiment, an electrode for a plasma spray device according to the present invention includes a plasma chamber region and a throat region coupled to the plasma chamber region. The throat region has an end surface and an axial bore. The axial bore is formed substantially along a longitudinal axis of the throat region. The axial bore is for ejecting a plasma stream. The axial bore has at least a cross-sectional shape for lineating a flow of the plasma stream before the plasma stream exits the axial bore.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail to avoid unnecessarily obscuring the present invention.

Figure 1:
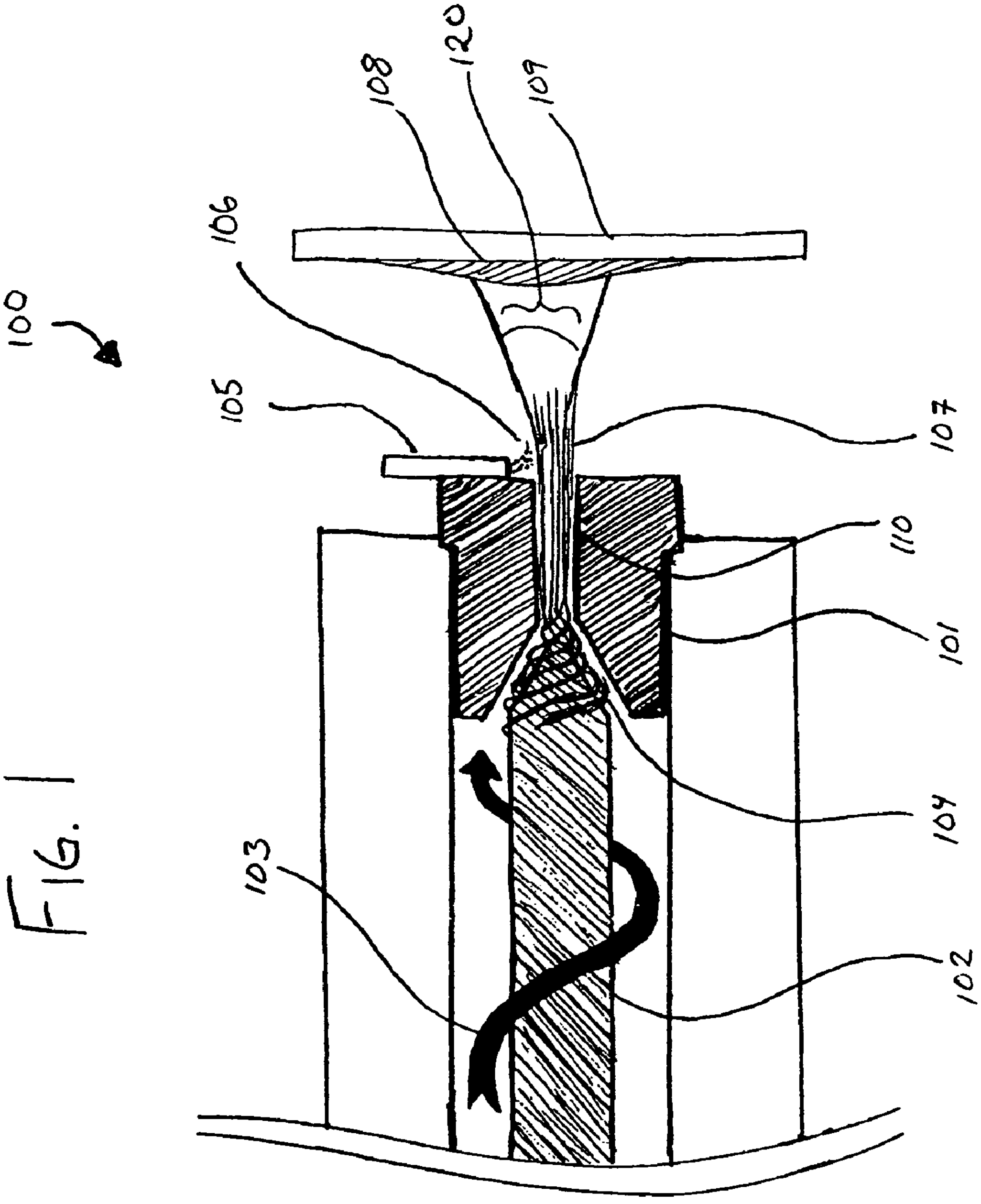
FIG. 1 is a simplified diagram of a plasma spray device according to one embodiment of the present invention.

Referring to FIG. 1, a plasma spray device 100 according to one embodiment of the present invention includes a first electrode such as an anode 101 and a second electrode such as a cathode 102. A pressurized gas 103, such as, for example, hydrogen (H), argon (Ar), nitrogen (N), helium (He), or any combination thereof, passes around cathode 102 and through anode 101 . A high energy DC arc is formed between cathode 102 and anode 101 . The resistance heating from the arc causes inert gas 103 to reach extreme temperatures, dissociate and ionize to form a plasma 104. Anode 101 includes an axial bore 110 that can cause a plasma stream 107 to flow substantially linearly along at least a portion of axial bore 110, as described in more detail below. High velocity and high temperature plasma stream 107 exits from anode 101. Powdered coating material 106 is injected by an external powder injector 105 into plasma stream 107, where it is rapidly heated and accelerated to a high velocity. The molten or heat-softened coating material 106 is carried by plasma stream 107 to the surface of target 109, where it rapidly cools to form a desired coating 108.

Because of the lineating design of anode 101, the induced swirling of inert gas 103 which occurs within plasma spray device 100 is substantially reduced as plasma stream 104 passes through axial bore 110 of anode 101. Lineation of the flow of plasma stream 107 confines the injected coating material 106 to a denser pattern, reducing the centrifugal ejection as it leaves anode 101 in plasma stream 107, such that the overall particle pattern angle θ 120 is substantially smaller than in conventional plasma spray devices. This smaller overall particle pattern angle θ 120 increases the concentration of coating material 106 in plasma stream 107 and thereby increases the depositional efficiency of the plasma spray device.

According to one aspect of the present invention, overall particle pattern angle θ for plasma stream 107 is less than about 90°. According to another aspect of the present invention, overall particle pattern angle θ for plasma stream 107 is less than about 50°. According to one embodiment, an overall particle pattern angle may be any number between 0 and 90°.

In another embodiment, the labels cathode and anode as described with respect to FIG. 1 may be reversed. In yet another embodiment, a powder injector may be located within an anode or within a plasma spray device.

Figure 2:
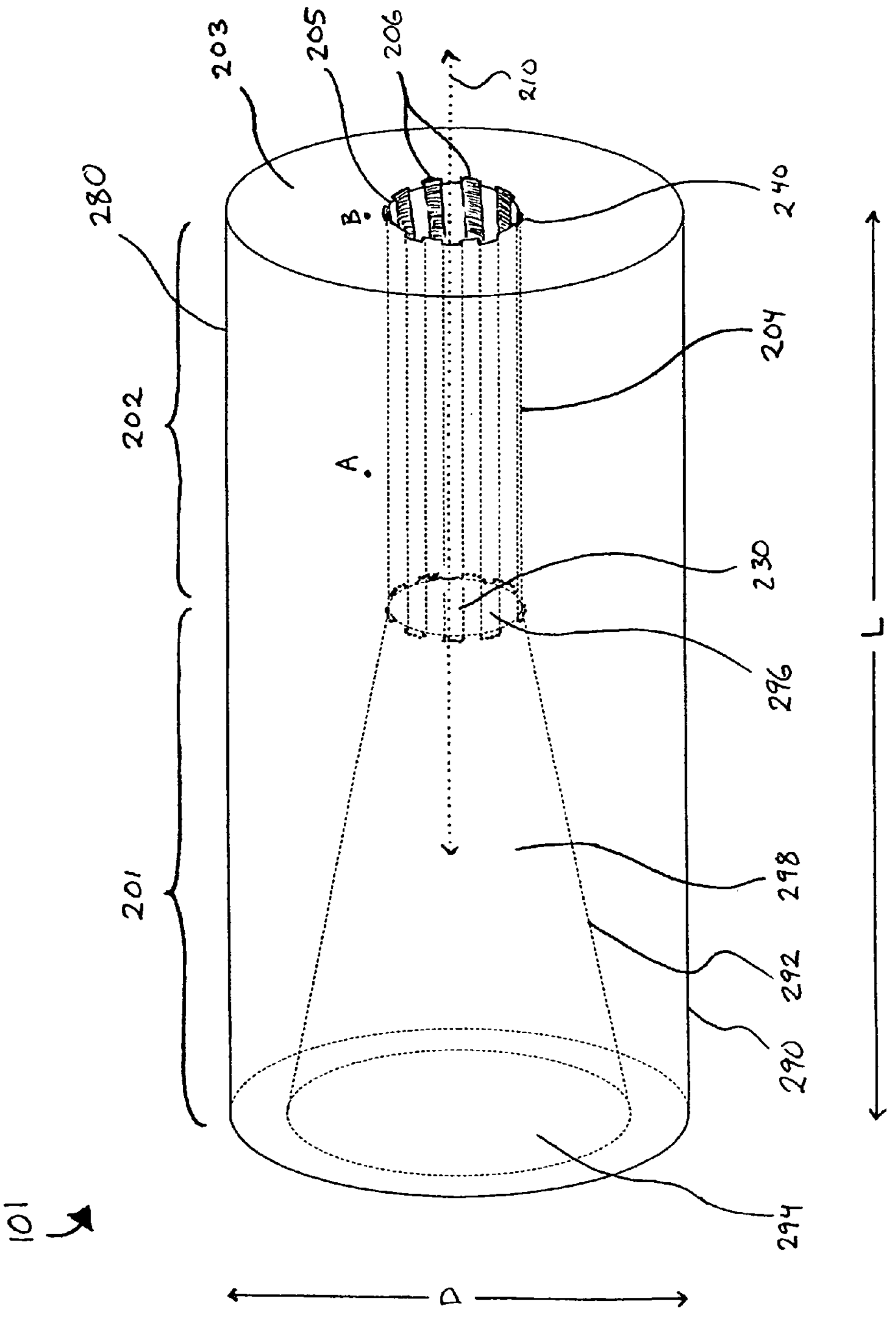
FIG. 2 illustrates a closer partial view of a plasma spray device according to one aspect of the present invention.

Referring now to FIG. 2, anode 101 according to one aspect of the present invention is illustrated in greater detail. Anode 101 includes a plasma chamber region 201 for having a plasma formed, and a throat region 202 integrally coupled to plasma chamber region 201. Plasma chamber region 201 includes an outer wall 290 and an inner wall 292. Outer wall 290 is cylindrical, and inner wall 292 is conical. The inner wall 292 creates a chamber 289 with a first end 284 and a second end 296. The invention is not limited to the shape of plasma chamber region 201 shown in FIG. 2, and a plasma chamber region of the present invention may employ a variety of shapes and configurations.

Throat region 202 has an outer wall 280, an end surface 203 and an axial bore 204. Outer wall 280 is cylindrical in this example, but it may be any shape (e.g., rectangular, polygonal, elliptical, irregular). Axial bore 204 having a first end 230 and a second end 240 is formed within throat region 202 substantially along a longitudinal axis 210 of throat region 202, and has a non-circular cross-sectional shape. In this example, first end 230 of axial bore 204 is second end 296 of plasma chamber region 201. Second end 240 of axial bore 204 is at end surface 203 of throat region 202. Axial bore 204 at second end 240 (or at end surface 203) ejects a plasma stream. According to one embodiment of the present invention, an axial bore can be a hole, an opening, or a passage.

In this example, the longitudinal axis 210 is located substantially along the center line of throat region 202. In another embodiment, a longitudinal axis may be away from the center line. In yet another embodiment, a longitudinal axis may be substantially perpendicular or substantially not perpendicular to end surface 203. According to another embodiment, a throat region may be non-integrally coupled to a plasma chamber region, and a throat region may be directly or indirectly coupled to a plasma chamber region.

According to another aspect of the present invention, axial bore 204 includes a plurality of grooves 206 formed substantially along the longitudinal axis of throat region 202. Grooves 206 may extend throughout the entire length of axial bore 204 as shown in FIG. 2 or only a portion of the length of axial bore 204. For example, grooves 206 may extend from point A to point B, where point A is a point between first end 230 and second end 240, and point B is second end 240. Grooves 206 may be created using broaches, mills, lathes, or any other means of machining. The effect, size, number and placement of grooves 206 may vary according to specific process requirements of the plasma spray device.

According to another embodiment of the present invention, axial bore 204 has a cross sectional shape for lineating the flow of the plasma stream before the plasma stream exits axial bore 204 at second end 240. The lineation of the flow of the plasma stream reduces the induced swirling of gas within the plasma spray device, improving the depositional efficiency of the plasma spray device as explained more fully below.

According to one embodiment, anode 101 includes copper (Cu) or tungsten (W). According to another embodiment, anode 101 may have a length L of about 2.5 inches and have an outside diameter D of about 1.6 inches.

Figure 3B:
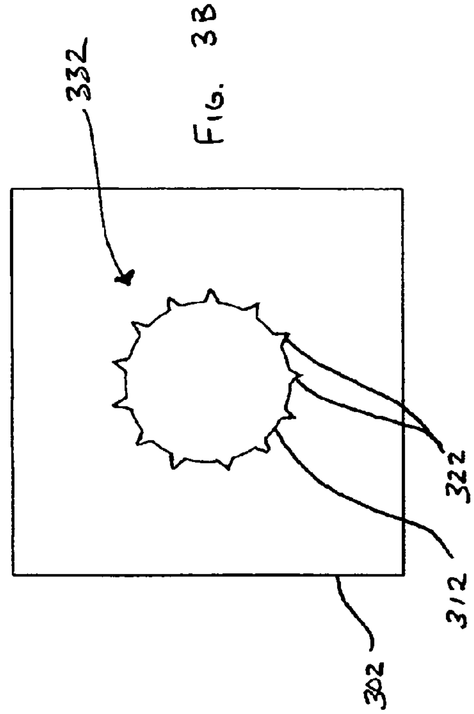
FIGS. 3A-3D illustrate cross sectional partial views of plasma spray devices according to several aspects of the present invention.
Figure 3D:
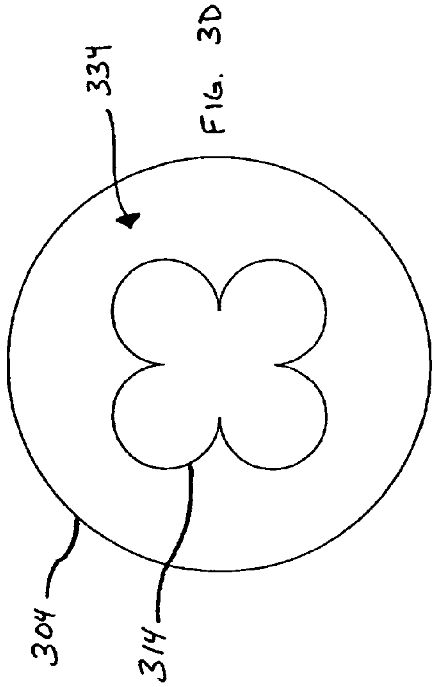
Figure 3A:
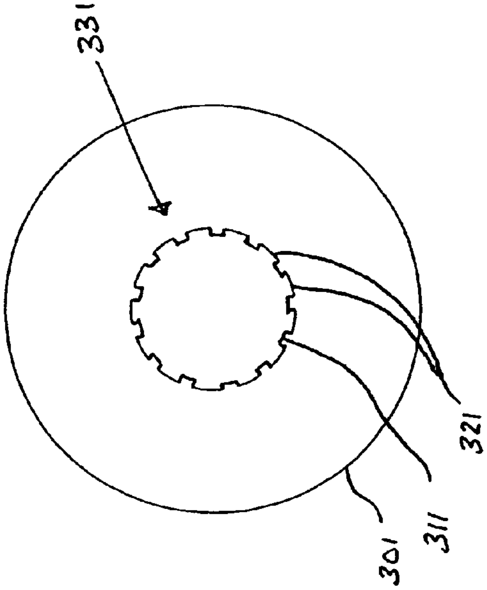

With reference to FIGS. 3A-3D, it can be seen that a variety of cross-sectional shapes for an axial bore are suitable for lineating the flow of the plasma stream. According to one aspect, FIG. 3A illustrates an electrode 301 having an axial bore 331 with a cross-sectional shape 311 defined by multiple grooves 321 with substantially rectilinear shapes. Grooves 321 are formed on a wall of axial bore 331 substantially along the longitudinal axis of the throat region of electrode 301. According to another aspect of the present invention, FIG. 3B illustrates an electrode 302 having an axial bore 332 with a cross-sectional shape 312 defined by a number of substantially V-shaped grooves 322 formed on a wall of axial bore 332 substantially along the longitudinal axis of the throat region of electrode 302. A variety of shapes of an electrode is suitable for the present invention, including without limitation an electrode having a square cross-sectional shape, as illustrated in FIG. 3B.

Figure 3C:
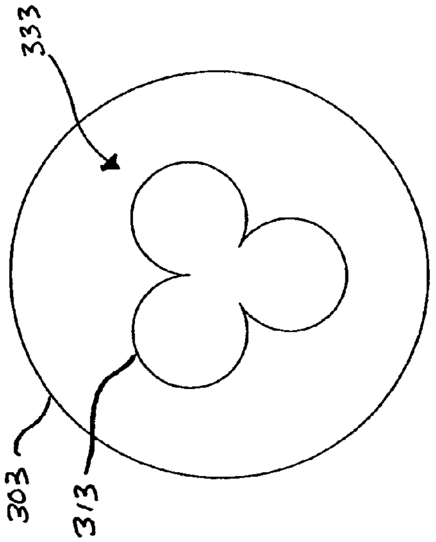

As can be seen with reference to FIGS. 3C and 3D, the present invention is not limited to axial bores with a plurality of grooves. According to yet another aspect of the current invention, FIG. 3C illustrates an electrode 303 having an axial bore 333 with a cross-sectional shape 313 defined by three overlapping substantially circular lobes for lineating the flow of the plasma stream. According to yet another aspect of the current invention, FIG. 3D illustrates electrode an 304 having an axial bore 334 with a cross-sectional shape 314 defined by four overlapping substantially circular lobes for lineating the flow of the plasma stream.

FIGS. 3A-3D illustrate just a few of the many possible cross-sectional shapes of the axial bore of the present invention. As will be apparent to one skilled in the art, the cross-sectional shape of the axial bore of the present invention could be any non-circular shape suitable for lineating the flow of the plasma stream. According to one aspect of the present invention, a non-circular cross-sectional shape may extend throughout the entire length of an axial bore or may extend through only a portion of the length of the axial bore.

Figure 4:
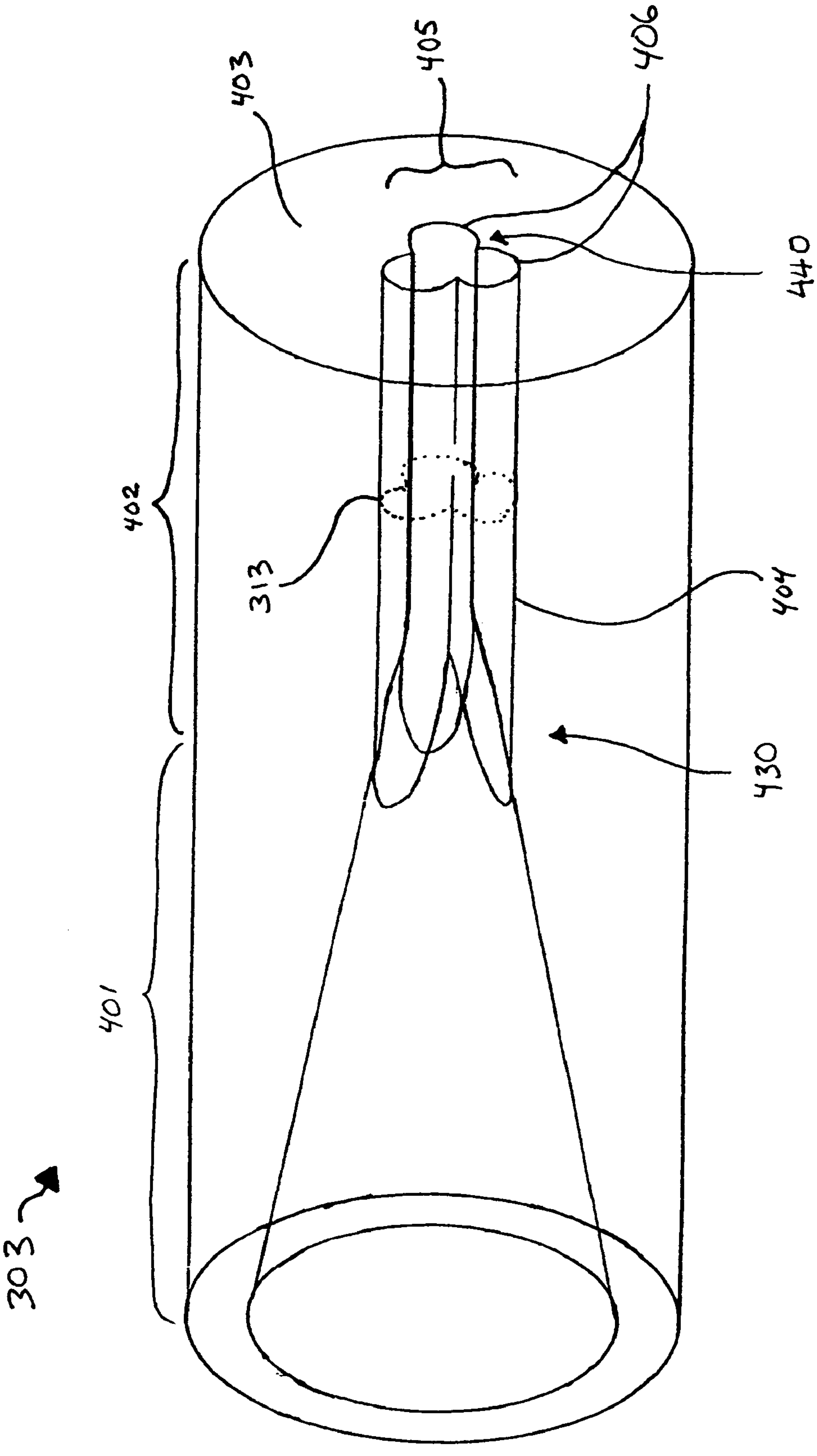
FIG. 4 illustrates a closer partial view of a plasma spray device according to another embodiment of the present invention.

Referring now to FIG. 4, electrode 303 for a plasma spray device according to another embodiment of the present invention is illustrated in greater detail. Electrode 303 includes a plasma chamber region 401 and a throat region 402 coupled to plasma chamber region 401. Throat region 402 has an end surface 403 and an axial bore 404. Axial bore 404 having a first end 430 and a second end 440 is formed within throat region 402 substantially along a longitudinal axis of throat region 402, and has a non-circular cross-sectional shape 313. First end 430 of axial bore is coupled to plasma chamber region 401, second end 440 is at end surface 403. Axial bore 404 at second end 440 (or at end surface 403) ejects a plasma stream.

According to one aspect of the present invention, electrode 303 may be cooled by the flow of a liquid coolant (not shown) in and/or around electrode 303. The liquid coolant may be water, a mixture of ethylene glycol and water, or another suitable liquid coolant.

According to another aspect of the present invention, axial bore 404 has a non-circular cross-sectional shape 313 defined by a plurality of overlapping substantially circular lobes 406 for lineating the flow of the plasma stream before the plasma stream exits axial bore 404.

Figure 5A:
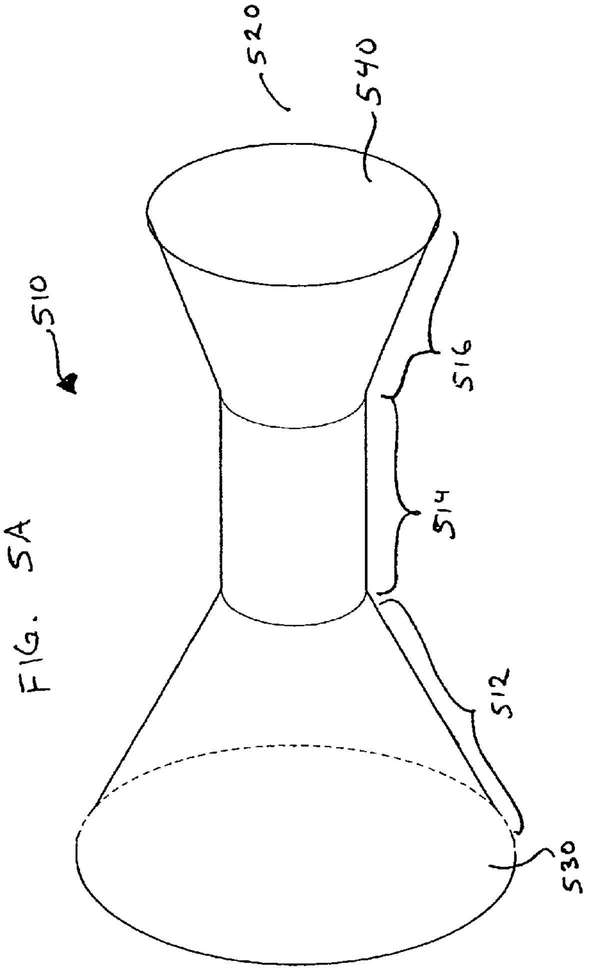
FIGS. 5A and 5B illustrate axial bores of plasma spray devices according to various embodiments of the present invention.

Now referring to FIG. 5A, an exemplary diagram of an axial bore of a plasma spray device according to one embodiment of the present invention is illustrated. An axial bore 510 may include a first end 530 and a second end 540. First end 530 may be coupled directly or indirectly to a plasma chamber region. Second end 540 may be at an end surface of a throat region of a plasma spray device where a plasma stream is ejected. Axial bore 510 may further include a first conical section 512, a cylindrical section 514, and a second conical section 516 substantially along a longitudinal axis 520.

According to one embodiment, the diameter of axial bore 510 at first end 530 may be about 1 inch, the diameter of axial bore 510 at cylindrical section 514 may be about 5⁄16 inches, and the diameter of axial bore at second end 540 may be about ¾ inches. The length of axial bore 510 may be about 2.5 inches.

Figure 5B:
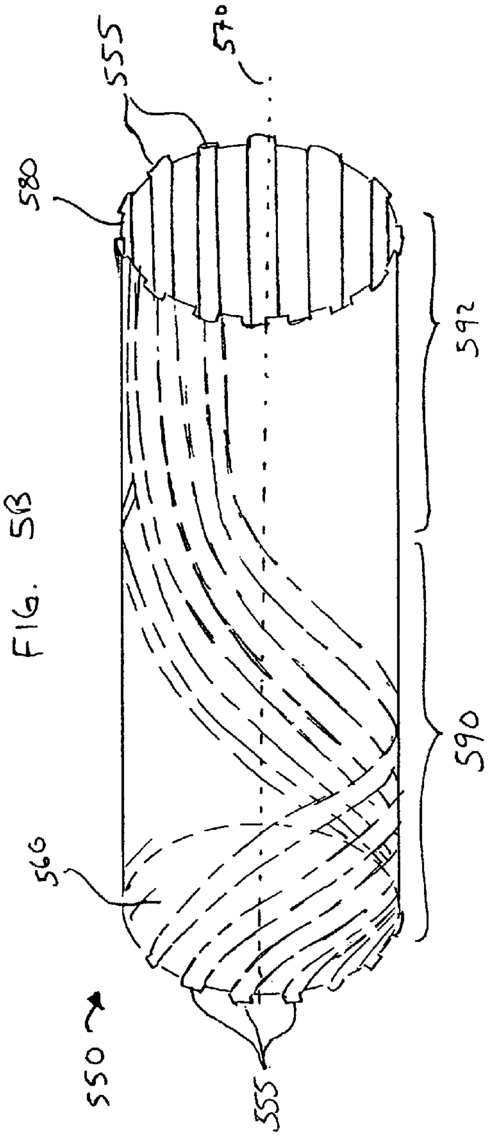

Now referring to FIG. 5B, another exemplary diagram of an axial bore is illustrated according to one embodiment of the present invention. An axial bore 550 includes non-circular cross-sectional shapes such as that defined by grooves 555. Axial bore 550 further includes a first end 560, a second end 580, and two regions 590 and 592 between first end 560 and second end 580. Within region 590, grooves 555 are substantially not parallel to longitudinal axis 570. Within region 592, grooves 555 are substantially parallel to longitudinal axis 570. In another embodiment, axial bore 550 may include other non-circular cross-sectional shapes (e.g., overlapping lobes).

The present invention is not limited to the shapes of an axial bore shown in FIGS. 2 and 5A, and the cross-sectional size and shape of an axial bore may vary along the axial bore. For example, according to one aspect of the present invention, the cross-sectional size of an axial bore at one point may differ from the cross-sectional size of the axial bore at another point along the axial bore. According to another aspect of the present invention, the cross-sectional shape of an axial bore at one point may differ from the cross-sectional shape of the axial bore at another point along the axial bore. According to yet another aspect of the present invention, the cross-sectional shape and/or the cross-sectional size may vary continuously along a portion(s) of the axial bore or along the entire length of the axial bore. According to yet another aspect of the present invention, the cross-sectional shape and/or the cross-sectional size may vary abruptly at one or more points along the axial bore.

Figure 6A:
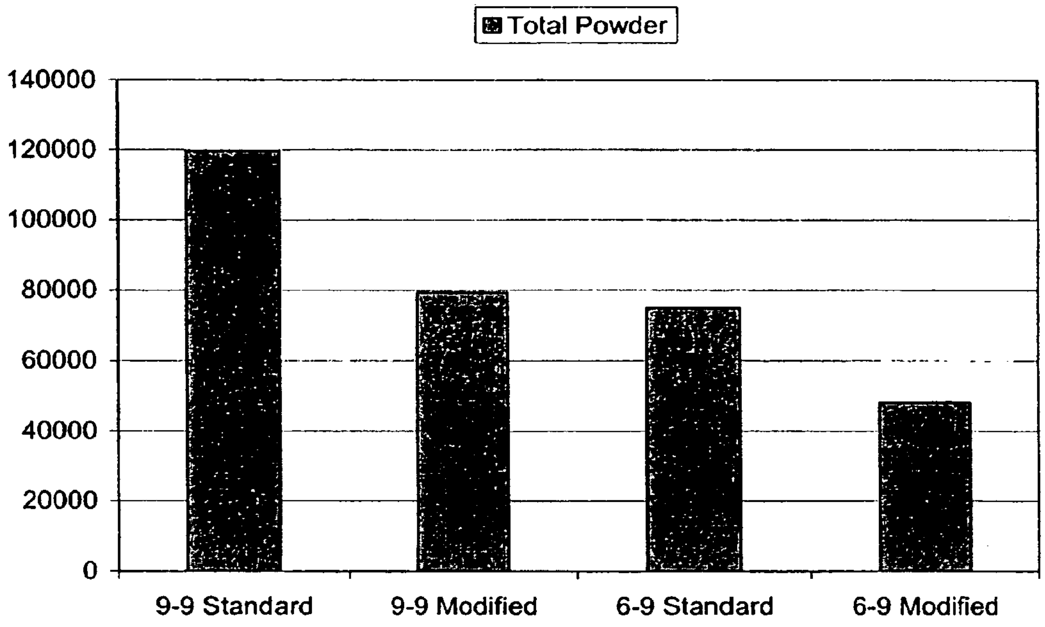
FIGS. 6A and 6B are charts illustrating performance advantages of a plasma spray device according to yet another aspect of present invention.
Figure 6B:
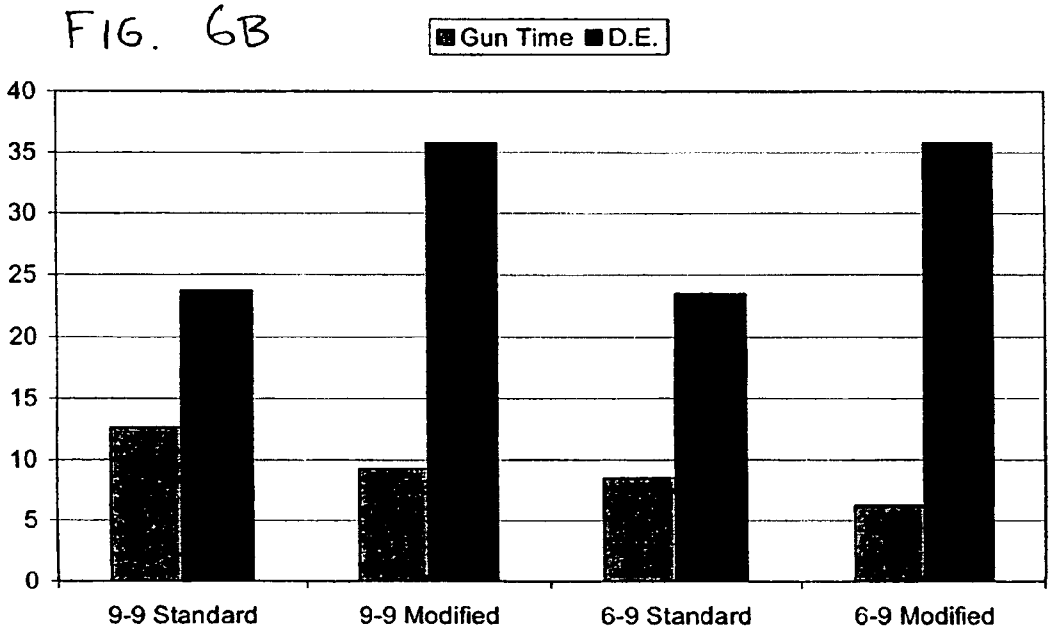

Turning now to FIGS. 6A and 6B, the advantages in processing speed and in depositional efficiency of one embodiment of the present invention are summarized in chart form. For the analysis summarized in FIGS. 6A and 6B, and in Table 1 below, targets in the shape of cylindrical tubes were sprayed with a lineated anode according to one aspect of the present invention. The powdered coating material sprayed by the plasma spray device was 100-140 mesh silicon powder with 8% Aluminum by weight, of 170-325 mesh. Using a conventional, non-lineated anode, one cylindrical tube was coated with 9 mm of the coating material around its circumference along its entire length. This process required 12.62 hours and consumed 119,789 grams of powdered coating material to add 28,116 grams of coating material to the tube, with a 23.47% depositional efficiency. Using a plasma spray device with a lineated anode according to one embodiment of the present invention, the same 9 mm conformal coating was applied to another cylindrical target tube in only 9.25 hours, the process consuming only 79,370 grams of powdered coating material to add 28,418 grams of coating material to the tube, with a 35.8% depositional efficiency.

Similarly, to add a circumferential coating of 6 mm along the length of another cylindrical target tube, a plasma spray device with a conventional, non-lineated anode requires, on average, 8.5 hours and consumes about 75,000 grams of powdered coating material. In contrast, a plasma spray device with a lineated anode according to one embodiment of the present invention with a 35.8% depositional efficiency would require only 6.23 hours and would consume only 48,150 grams of coating powder to accomplish the same task.

TABLE 1

| | Gun Time | Depositional Efficiency | Total Powder Used |
|---|---|---|---|
| 9-9 Standard Anode | 12.62 hours | 23.47% | 119,789 g |
| 9-9 Modified Anode | 9.25 hours | 35.8% | 79,370 g |
| 6-9 Standard Anode | 8.5 hours | 23.75% | 75,000 g |
| 6-9 Modified Anode | 6.23 hours | 35.8% | 48,150 g |

According to one embodiment of the present invention, because of the increased turbulence at the intersection of lineating axial bore and the plasma chamber region of the lineated anode, the wear on the lineated anode is substantially less than the wear evident on the conventional, non-lineated anode. This turbulence, caused by the transition of the plasma from a cyclonic flow to a linear flow, acts to prevent the high energy DC arc formed between the lineated anode and the cathode from adhering to one particular region or area of the lineated anode, such that the lineated anode experiences significantly less wear than a conventional non-lineated anode, thereby substantially extending the usable life of the lineated anode. In a lineated anode according to one aspect of the present invention, the wear evident after spraying 79,370 g of coating material using the lineated anode was about 25%-50% of the wear evident on a conventional anode used in the plasma spraying of 119,789 g.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A plasma spray device comprising:

a plasma chamber region for receiving a non-linear flow of gas and for forming a plasma therefrom; and a throat region for receiving the plasma from the plasma chamber region, the throat region being coupled to the plasma chamber region, the throat region having an end surface and an axial bore, the axial bore formed in a direction substantially along a longitudinal axis of the throat region, the axial bore having a non-circular cross-sectional shape, the axial bore at the end surface for ejecting a plasma stream, wherein the plasma stream has a flow that is lineated by the non-circular cross-sectional shape of the axial bore before the plasma stream is ejected from the axial bore.

2. The plasma spray device of claim 1, wherein the axial bore includes a plurality of grooves formed substantially along at least a portion of the longitudinal axis of the throat region.

3. The plasma spray device of claim 2, wherein the plurality of grooves have substantially rectilinear shapes.

4. The plasma spray device of claim 1, wherein the non-circular cross-sectional shape is defined by a plurality of overlapping substantially circular lobes.

5. The plasma spray device of claim 4, wherein the number of overlapping substantially circular lobes is 3.

6. The plasma spray device of claim 1, wherein the non-circular cross-sectional shape extends along at least a portion of the axial bore.

7. The plasma spray device of claim 1, wherein a cross-sectional size of the axial bore at a point along the axial bore is different from a cross-sectional size of the axial bore at another point along the axial bore.

8. The plasma spray device of claim 1, wherein the non-circular cross-sectional shape of the axial bore at a point along the axial bore is different from a non-circular cross-sectional shape of the axial bore at another point along the axial bore.

9. The plasma spray device of claim 1, wherein a high energy DC arc for forming the plasma causes reduced wear on a part of the plasma spray device because of turbulence in the plasma caused by lineating a flow of the plasma stream.

10. The plasma spray device of claim 1, wherein the plasma stream has an overall particle pattern angle of less than about 50° after being ejected from the axial bore.

11. The plasma spray device of claim 1 further comprising: a first electrode and a second electrode, the second electrode including the plasma chamber region and the throat region.

12. The plasma spray device of claim 1, wherein the non-circular cross-sectional shape of the axial bore is configured to rotate along a helical path aligned with the longitudinal axis, the helical path having a pitch that increases along the longitudinal axis towards the end surface.

13. The plasma spray device of claim 1, further comprising:

an external powder injector configured to inject a powdered coating material into the plasma stream near the end surface of the throat region.

14. A plasma spray device comprising:

a throat region for receiving a non-linear flow of a plasma, the throat region having an end surface and an axial bore, the axial bore formed within the throat region in a direction substantially along a longitudinal axis of the throat region, the axial bore having a plurality of grooves, at least a portion of the plurality of grooves formed in a direction substantially along the longitudinal axis of the throat region, the axial bore at the end surface for ejecting a plasma stream, wherein the plasma stream has a flow that is lineated by the plurality of grooves before the plasma stream is ejected from the axial bore.

15. The plasma spray device of claim 14, wherein the plurality of grooves have substantially rectilinear shapes.

16. The plasma spray device of claim 14, wherein the portion of the plurality of grooves extend to the end surface.

17. The plasma spray device of claim 14, wherein the plurality of grooves of the axial bore are configured to rotate along a helical path aligned with the longitudinal axis, the helical path having a pitch that increases along the longitudinal axis towards the end surface.

18. An electrode for a plasma spray device, the electrode comprising:

a plasma chamber region; and a throat region for receiving a non-linear flow of a plasma from the plasma chamber region, the throat region being coupled to the plasma chamber region, the throat region having an end surface and an axial bore, the axial bore formed substantially along a longitudinal axis of the throat region, the axial bore for ejecting a plasma stream, the axial bore having at least a cross-sectional shape for lineating a flow of the plasma stream before the plasma stream exits the axial bore.

19. The electrode for a plasma spray device of claim 18, wherein the axial bore includes a plurality of grooves formed on a wall of the axial bore and wherein at least a portion of the plurality of grooves are formed substantially parallel to the longitudinal axis of the throat region.

20. The electrode for a plasma spray device of claim 18, wherein the axial bore has a cross-sectional shape defined by a plurality of overlapping substantially circular lobes.

21. The electrode for a plasma spray device of claim 18, wherein the axial bore includes a first end and a second end, the first end is coupled to the plasma chamber region, the second end is at the end surface, and the cross-sectional shape extends at least from a point between the first end and the second end to the second end.

22. The electrode for a plasma spray device of claim 18, wherein the cross-sectional shape of the axial bore is configured to rotate along a helical path aligned with the longitudinal axis, the helical path having a pitch that increases along the longitudinal axis towards the end surface.

* * * * *